Patented Jan. 23, 1940

2,187,848

UNITED STATES PATENT OFFICE 2,187,848

PERMANENTLY STIFFENED COLLAR AND THE LIKE

Wyly M. Billing, Kennett Square, Pa., assignor to Hercules Powder Company, Wilmington, Del., a corporation of Delaware No Drawing. Application April 25, 1935,
Serial No. 18,257

11 Claims. (Cl. 154—46)

This invention relates to articles of laminated cloth, such as, for example, shirt collars, shirt cuffs, dress shirt bosoms, and the like, and to methods of producing such articles.

It has heretofore been known to produce laminated cloth articles of this type by joining an outer, finely woven cloth to a relatively coarse base fabric by means of some adhesive or bonding material, usually a layer or sheet of thermoplastic material. Such laminated cloth articles are designed to possess the property of retaining permanently a stiffened or starched appearance, despite repeated laundering, and without the subsequent use of starch or other stiffening material.

Such laminated cloth articles heretofore produced, however, have not been entirely satisfactory for various reasons. A common difficulty encountered was the destruction of adhesion and resiliency of the bonding material upon repeated laundering, particularly in the presence of small amounts of alkali, with consequent separation of the layers of fabric. Other bonding materials showed a tendency to "bleed" through the outer layer of cloth and so discolor and spoil the article.

Now in accordance with this invention there is provided a laminated cloth article which will not lose its resiliency or the adhesion between its laminations on repeated launderings, even in the presence of alkali, and which has no tendency to discolor through a "bleeding" of the bonding material.

The laminated article in accordance with this invention will comprise a plurality of layers of cloth, of any desired type, adhered and bonded together by means of a thermoplastic material comprising essentially a chlorine-containing compound of rubber, by which is meant and included chlorinated rubber, rubber hydrochloride, chlorinated rubber hydrochloride, etc.

In the practical adaptation of this invention the laminations of cloth, one or both of which may be coated with the chlorine-containing rubber compound bonding material, or which may have positioned between them a sheet of such bonding material, are united under heat and pressure to form the laminated article.

The thermoplastic bonding material may comprise a chlorine-containing compound of rubber, as chlorinated rubber, rubber hydrochloride, chlorinated rubber hydrochloride, etc. of widely varying chlorine content, and produced by any well known or desired procedure involving the treatment with chlorine, treatment with hydrochloric acid or treatment with hydrochloric acid and then with chlorine, of vulcanized, unvulcanized, or reclaimed rubber, latex, gutta percha, balata, and the like.

Thus, for example, the chlorine-containing rubber compounds may contain chlorine in the form of HCl and/or $Cl_2$ in the amounts shown below:

Chlorinated rubber _____ 50–75% Cl, preferably about 67%
Rubber hydrochloride _____ 28–35% Cl, preferably about 33%
Chlorinated rubber hydrochloride _____ 30–62% Cl, preferably about 51%

The chlorine-containing rubber compound may be used as the sole ingredient of the thermoplastic bonding material in accordance with this invention, and in many cases will desirably be used alone. However, in various instances it will be desirable to include other ingredients in the bonding composition. Thus, resins, as for example, cumarone-indene resins, bitumens, Amberol, drying, oil modified glycerol phthalate, etc., may be added to stiffen the bonding material; plasticizers or softeners, as for example, hydrogenated methyl abietate, chlorinated paraffin, chlorinated diphenyl, butyl stearate phosphate and phthalate plasticizers, etc. may be added to soften or flexibilize the bonding composition; and white or tinted pigments may be added to make the laminated article match the color of a garment to which it is to be attached. All these auxiliary ingredients may be added in varying proportions, depending upon the type of chlorine-containing rubber compound used and the use for which the laminated article is intended. It is, however, important to keep the formulation within such limits that the bonding material produced will soften under the heat used in consolidation, but will not become so fluid as to run through the cloth or fabric.

The formulae shown in the following table are illustrative of bonding compositions which may be used in accordance with this invention:

Table I

| Formula No. | 1 | 2 | 3 | 4 | 5 | 6 | 7 |
|---|---|---|---|---|---|---|---|
| Chlorinated rubber (67% Cl) parts by weight | 30 | 30 | 30 | 30 | 30 | 30 | 30 |
| Soft cumarone-indene resin parts by weight | 3 | 9 | | | | | |
| Chlorinated paraffin parts by weight | | | 3 | | | | |
| Hydrogenated methyl abietate parts by weight | | | | | | | |
| $TiO_2$ pigment parts by weight | | | | 3 | 9 | 7.5 | 7.5 |
| Ultramarine blue pigment parts by weight | | | | | | 7 | 7 |
| | | | | | | | 0.07 |

Other chlorine-containing rubber compounds, as rubber hydrochloride, chlorinated rubber hydrochloride, etc., may be substituted in formulae similar to the above for the chlorinated rubber.

The bonding composition, which may comprise solely a chlorine-containing rubber compound, or may include resins, plasticizers, pigments, etc., may be applied to either or both of the cloth laminations, but preferably only to the coarser or base layer of cloth, in solution in a volatile solvent, as for example, toluol, xylol, chlorinated hydrocarbons, etc. While even comparatively small quantities of bonding material will produce a certain degree of adhesion, the cloth should preferably be coated with not less than 0.20 lb. per sq. yd., dry weight, of bonding composition. A coating of 0.25 lb. per sq. yd., for example, will be found very satisfactory.

Alternatively the bonding composition may be formed into a sheet by any well known method, as, for example, casting from solution, extrusion, etc., and the sheet placed between the layers of cloth prior to the consolidating operation. The film or sheet of bonding material for use in this manner will desirably have a thickness not less than 0.001 inch, and preferably a thickness of about 0.002 inch.

Whether the bonding composition has been applied as a coating to the layers of cloth or whether it is used in the form of a sheet or film, the uniting and consolidation of the layers of cloth will be effected by applying heat and pressure by known methods, as with, for example, heated pressing irons, heated pressure rolls, etc. The temperature of the pressing means may be varied from the lowest at which softening takes place, about 90–125° C., depending on the adhesive, to that at which decomposition of the adhesive will occur, which temperature will, of course, vary with the time of pressing and the thickness of the adhesive layer, etc. A range of 135°–145° C. is representative of practical operating procedure. The time of pressing will likewise depend upon the temperature. Thus, for example, at 125° C. two minutes' pressing will barely give adhesion, while at 155° C. one minute represents the maximum time of pressing possible without decomposition. The pressures used may be varied widely, but a range of 100–200 lbs./sq. in. represents a practical operating range.

The resistance to laundering action of the laminated articles in accordance with this invention is illustrated by the following test:

A sample of laminated cloth made with a bonding material having a composition indicated in Formula No. 1 in Table I, above, was heated for three hours in a laundering solution comprising 1.45% soap, 0.78% $Na_2CO_3$, 97.77% water. At the end of this period the assembly had the crinkly snappiness characteristic of it when folded sharply, and the layers were very tightly adhered. On ironing the material, the folded places were easily and completely removed. Samples after three standard launderings had lost only 1.5% of their weight, and after six such treatments only 2.0% of their weight.

It will be understood that where in the claims appended hereto the term chlorine-containing rubber compound is used that such is intended to include chlorinated rubber, rubber hydrochloride and chlorinated rubber hydrochloride and that it is intended that chlorine-containing compounds of guttapercha, balata, and the like, are contemplated as equivalents for chlorine-containing rubber compounds.

It will be further understood that the details and examples hereinbefore set forth are illustrative only, and are in no way in limitation of the invention herein described and claimed.

What I claim and desire to protect by Letters Patent is:

1. A substantially permanently stiffened, laundering-resistant laminated cloth article of the character of shirt collars, shirt cuffs, dress shirt bosoms, and the like which are designed for wearing apparel and require laundering after use comprising at least two layers of cloth fabric and a layer of thermoplastic, non-bleeding bonding material, of sufficient thickness to give substantial stiffness and resiliency to the laminated article, interposed between each fabric layer and the fabric layer adjacent thereto and adhesively uniting said fabric layers, said bonding material comprising essentially a chlorine-containing rubber compound having a chlorine content of not less than 28% and selected from the group consisting of chlorinated rubber, rubber hydrochloride and chlorinated rubber hydrochloride.

2. A substantially permanently stiffened, laundering-resistant laminated cloth article of the character of shirt collars, shirt cuffs, dress shirt bosoms, and the like which are designed for wearing apparel and require laundering after use comprising at least two layers of cloth fabric and a layer of thermoplastic, non-bleeding bonding material, of sufficient thickness to give substantial stiffness and resiliency to the laminated article, interposed between each fabric layer and the fabric layer adjacent thereto and adhesively uniting said fabric layers, said bonding material comprising essentially chlorinated rubber containing at least 50% by weight of chlorine.

3. A substantially permanently stiffened, laundering-resistant laminated cloth article of the character of shirt collars, shirt cuffs, dress shirt bosoms, and the like which are designed for wearing apparel and require laundering after use comprising a coarse base fabric, a fine outer fabric and a layer of thermoplastic, non-bleeding bonding material, of sufficient thickness to give substantial stiffness and resiliency to the laminated article, interposed between and adhesively uniting said fabric layers, said bonding material comprising essentially a chlorine-containing rubber compound having a chlorine content of not less than 28% and selected from the group consisting of chlorinated rubber, rubber hydrochloride and chlorinated rubber hydrochloride.

4. A substantially permanently stiffened, laundering-resistant laminated cloth article of the character of shirt collars, shirt cuffs, dress shirt bosoms, and the like which are designed for wearing apparel and require laundering after use comprising a coarse base fabric, a fine outer fabric and a layer of thermoplastic, non-bleeding bonding material, of sufficient thickness to give substantial stiffness and resiliency to the laminated article, interposed between and adhesively uniting said fabric layers, said bonding material comprising essentially chlorinated rubber.

5. A substantially permanently stiffened, laundering-resistant laminated cloth article of the character of shirt collars, shirt cuffs, dress shirt bosoms, and the like which are designed for wearing apparel and require laundering after use comprising at least two layers of cloth fabric and a layer of thermoplastic, non-bleeding bonding material, of sufficient thickness to give substantial stiffness and resiliency to the laminated article, interposed between each fabric layer and the fabric layer adjacent thereto and adhesively uniting said fabric layers, said bonding material comprising essentially a chlorine-containing rubber compound having a chlorine content of not less than 28% and selected from the group consisting of chlorinated rubber, rubber hydrochloride, and chlorinated rubber hydrochloride, said bonding material also containing a resin.

6. A substantially permanently stiffened, laundering-resistant laminated cloth article of the character of shirt collars, shirt cuffs, dress shirt bosoms, and the like which are designed for wearing apparel and require laundering after use comprising at least two layers of cloth fabric and a layer of thermoplastic, non-bleeding bonding material, of sufficient thickness to give substantial stiffness and resiliency to the laminated article, interposed between each fabric layer and the fabric layer adjacent thereto and adhesively uniting said fabric layers, said bonding material comprising essentially a chlorine-containing rubber compound having a chlorine content of not less than 28% and selected from the group consisting of chlorinated rubber, rubber hydrochloride, and chlorinated rubber hydrochloride, said bonding material also containing a plasticizer.

7. A substantially permanently stiffened, laundering-resistant laminated cloth article of the character of shirt collars, shirt cuffs, dress shirt bosoms, and the like which are designed for wearing apparel and require laundering after use comprising at least two layers of cloth fabric and a layer of thermoplastic, non-bleeding bonding material, of sufficient thickness to give substantial stiffness and resiliency to the laminated article, interposed between each fabric layer and the fabric layer adjacent thereto and adhesively uniting said fabric layers, said bonding material comprising essentially a chlorine-containing rubber compound having a chlorine content of not less than 28% and selected from the group consisting of chlorinated rubber, rubber hydrochloride, and chlorinated rubber hydrochloride, said bonding material also containing a pigment.

8. A substantially permanently stiffened, laundering-resistant laminated cloth article of the character of shirt collars, shirt cuffs, dress shirt bosoms, and the like which are designed for wearing apparel and require laundering after use comprising at least two layers of cloth fabric and a layer of thermoplastic, non-bleeding bonding material approximately 0.002 inch thick interposed between each fabric layer and the fabric layer adjacent thereto and adhesively uniting said fabric layers, said bonding material comprising essentially a chlorine-containing rubber compound having a chlorine content of not less than 28% and selected from the group consisting of chlorinated rubber, rubber hydrochloride and chlorinated rubber hydrochloride.

9. A substantially permanently stiffened, laundering-resistant laminated cloth article of the character described comprising at least two layers of cloth fabric and a layer of thermoplastic, non-bleeding bonding material approximately 0.002 inch thick interposed between each fabric layer and the fabric layer adjacent thereto and adhesively uniting said fabric layers, said bonding material comprising essentially chlorinated rubber containing at least 50% by weight of chlorine.

10. A substantially permanently stiffened, laundering-resistant laminated cloth article of the character of shirt collars, shirt cuffs, dress shirt bosoms and the like, which are designed for wearing apparel and require laundering after use, comprising at least two layers of cloth fabric and a layer of thermoplastic, non-bleeding bonding material, of sufficient thickness to give substantial stiffness and resiliency to the laminated article, interposed between each fabric layer and the fabric layer adjacent thereto and adhesively uniting said fabric layers, said bonding material comprising essentially rubber hydrochloride containing at least 28% by weight of chlorine.

11. A substantially permanently stiffened, laundering-resistant laminated cloth article of the character of shirt collars, shirt cuffs, dress shirt bosoms and the like, which are designed for wearing apparel and require laundering after use, comprising at least two layers of cloth fabric and a layer of thermoplastic, non-bleeding bonding material, of sufficient thickness to give substantial stiffness and resiliency to the laminated article, interposed between each fabric layer and the fabric layer adjacent thereto and adhesively uniting said fabric layers, said bonding material comprising essentially chlorinated rubber hydrochloride containing at least 30% by weight of chlorine.

WYLY M. BILLING.